United States Patent
Araújo et al.

(10) Patent No.: US 12,423,859 B2
(45) Date of Patent: Sep. 23, 2025

(54) DEPTH SENSOR ACTIVATION FOR LOCALIZATION BASED ON DATA FROM MONOCULAR CAMERA

(71) Applicant: Telefonaktiebolaget LM Ericsson (publ), Stockholm (SE)

(72) Inventors: José Araújo, Stockholm (SE); AmirHossein Taher Kouhestani, Solna (SE); Diego Gonzalez Morin, Madrid (ES); Ioannis Karagiannis, Kalamata (GR); Ananya Muddukrishna, Enskededalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 422 days.

(21) Appl. No.: 17/796,386

(22) PCT Filed: Feb. 12, 2020

(86) PCT No.: PCT/EP2020/053585
§ 371 (c)(1),
(2) Date: Jul. 29, 2022

(87) PCT Pub. No.: WO2021/160257
PCT Pub. Date: Aug. 19, 2021

(65) Prior Publication Data
US 2023/0342972 A1 Oct. 26, 2023

(51) Int. Cl.
*G06T 7/73* (2017.01)
*G06F 1/3206* (2019.01)
(Continued)

(52) U.S. Cl.
CPC ............. *G06T 7/73* (2017.01); *G06F 1/3206* (2013.01); *G06N 20/00* (2019.01); *G06T 7/50* (2017.01);
(Continued)

(58) Field of Classification Search
None
See application file for complete search history.

(56) References Cited

U.S. PATENT DOCUMENTS

| | | |
|---|---|---|
| 2014/0139639 A1 | 5/2014 | Wagner et al. |
| 2014/0254880 A1 | 9/2014 | Srinivasan et al. |
| | (Continued) | |

FOREIGN PATENT DOCUMENTS

| | | |
|---|---|---|
| CN | 104956404 A | 9/2015 |
| CN | 105164610 A | 12/2015 |
| | (Continued) | |

OTHER PUBLICATIONS

STIC Provided Translation of JP 2018-005470 A (Year: 2018).*
(Continued)

*Primary Examiner* — Tyler W. Sullivan
(74) *Attorney, Agent, or Firm* — Sage Patent Group

(57) ABSTRACT

A device is disclosed that is configured to perform localization using one or both of a monocular camera and a depth sensor that are transportable with the device. The device includes at least one processor operationally connected to the monocular camera and the depth sensor. The device also includes at least one memory storing program code that is executed by the at least one processor to perform operations to receive image data from the monocular camera. The operations determine a benefit level of activating the depth sensor for localization, based on the image data, and activate the depth sensor for localization based on a determination that the benefit level of activating the depth sensor satisfies an activation rule. Related methods and computer program products are also disclosed.

13 Claims, 8 Drawing Sheets

(51) Int. Cl.
- *G06N 20/00* (2019.01)
- *G06T 7/50* (2017.01)
- *G06T 7/55* (2017.01)
- *G06T 17/00* (2006.01)
- *G06V 10/764* (2022.01)
- *G06T 5/90* (2024.01)
- *G06T 15/00* (2011.01)

(52) U.S. Cl.
CPC ............... *G06T 7/55* (2017.01); *G06T 17/00* (2013.01); *G06V 10/764* (2022.01); *G06T 5/90* (2024.01); *G06T 15/00* (2013.01); *G06T 2207/10016* (2013.01); *G06T 2207/10024* (2013.01); *G06T 2207/10028* (2013.01); *G06T 2207/30168* (2013.01)

(56) References Cited

U.S. PATENT DOCUMENTS

| | | | |
|---|---|---|---|
| 2014/0267631 A1* | 9/2014 | Powers | H04N 23/20 348/47 |
| 2016/0088206 A1 | 3/2016 | Robinson et al. | |
| 2017/0221225 A1 | 8/2017 | Peri | |
| 2019/0068940 A1 | 2/2019 | Beardsley et al. | |
| 2020/0177869 A1* | 6/2020 | Choi | G01S 17/86 |
| 2021/0011288 A1* | 1/2021 | Lai | H04N 13/106 |
| 2023/0089616 A1* | 3/2023 | Araujo et al. | H04N 23/66 348/135 |

FOREIGN PATENT DOCUMENTS

| | | | |
|---|---|---|---|
| CN | 108604010 A | | 9/2018 |
| JP | 2018005470 A | * | 1/2018 |
| TW | M461113 U | * | 9/2013 |
| TW | M463370 U | * | 10/2013 |
| WO | 2019027530 A1 | | 2/2019 |
| WO | WO-2020185322 A1 | * | 9/2020 ........... G02B 27/017 |

OTHER PUBLICATIONS

STIC Provided Translation of TW-M463370-U (Year: 2013).*
STIC Provided Translation of TW-M461113-U (Year: 2013).*
International Search Report and Written Opinion mailed June 3, 2020 for International Patent Application No. PCT/EP2020/053585, 14 pages.
R. Dubé et al., "SegMap: 3D Segment Mapping Using Data-Driven Descriptors", Robotics: Science and Systems (RSS), 2018, 11 pages.
M. Labbé et al., "RTAB-Map as an open-source lidar and visual simultaneous localization and mapping library for large-scale and long-term online operation", Journal of Field Robotics, vol. 36, Issue 2, pp. 416-446, 2018. [Need Copy].

* cited by examiner

Deactivate the monocular camera based on a determination that the benefit level of using the monocular camera for localization satisfies a deactivation rule — 800

Figure 8

Process the image data from the monocular camera through a localization algorithm to obtain depth points within an environment which is sensed by the monocular camera — 900

Estimate a density of the depth points that are within a range of the depth sensor, wherein the benefit level is determined based on the estimate of the density of the depth points — 902

Figure 9

Process the image data from the monocular camera through a localization algorithm to obtain depth points within an environment which is sensed by the monocular camera — 1000

Determine a number of 3D features within depth reconstruction data for a portion of the environment based on a sequence of frames of the image data and the depth points — 1002

Figure 10

DEPTH SENSOR ACTIVATION FOR LOCALIZATION BASED ON DATA FROM MONOCULAR CAMERA

CROSS REFERENCE TO RELATED APPLICATIONS

This application is a 35 U.S.C. § 371 national stage application of PCT International Application No. PCT/EP2020/053585 filed on Feb. 12, 2020, the disclosures and content of which are incorporated by reference herein in their entirety.

TECHNICAL FIELD

The present disclosure relates to a device for performing localization using one or both of a monocular camera and a depth sensor that are transportable with the device, a method by a device for performing localization using one or both of a monocular camera and a depth sensor that are transportable with the device, and a corresponding computer program product.

BACKGROUND

Simultaneous localization and mapping (SLAM) is a fundamental technology that allows devices to localize themselves in an environment while relying on onboard sensors such as cameras, range sensors, and inertial sensors, among others. This is essential for robots, such as drones and autonomous vehicles, to navigate and understand an environment or to perform a task, as well as for enabling realistic and persistent content to be displayed in mixed reality (MR) devices.

For example, current MR headsets and state-of-the-art smartphones contain RGB cameras, depth/3D cameras (e.g. passive or active stereo, LIDAR, etc.), and inertial sensors (as part of an Inertial Measurement Unit, IMU), and the same is true for indoor and outdoor robots, such as drones and autonomous vehicles. Several SLAM algorithms have been proposed which rely on RGB and IMU sensors, depth sensors, or a combination of all of these. The reason for performing a combination of sensors is both to leverage on their advantages, but also to improve on their limitations.

For example, an RGB camera performs poorly in a dark or too bright environment, where a depth camera such as a LIDAR or active stereo camera would perform well in such scenarios. Moreover, by directly measuring depth, the localization and mapping may be performed with higher accuracy and may capture a larger amount of information of the environment (e.g. construction of a dense map instead of a sparse map), among other benefits. However, depth cameras usually have a larger energy consumption and processing requirements and may perform poorly in certain conditions. For example, depth cameras have a limited measurement range, and may perform badly in low textured environments (passive stereo cameras) and in areas with directly sunlight or IR interference (active stereo cameras and LIDAR), under rain conditions (LIDAR), among other limitations.

SUMMARY

Currently available devices which use sensors for localization, such as Microsoft Hololens®, Magic Leap®, ARCore® and ARKit®, assume that all such sensors are always active, e.g., powered-on, and have no awareness of the need for and ability to perform selective activation and deactivation of individual sensors.

Some embodiments of the present disclosure are directed to a device that is configured to perform localization using one or both of a monocular camera and a depth sensor that are transportable with the device. The device includes at least one processor operationally connected to the monocular camera and the depth sensor. The device also includes at least one memory storing program code that is executed by the at least one processor to perform operations to receive image data from the monocular camera. The operations determine a benefit level of activating the depth sensor for localization, based on the image data, and activate the depth sensor for localization based on a determination that the benefit level of activating the depth sensor satisfies an activation rule.

Some other related embodiments are directed to a method by a device for performing localization using one or both of a monocular camera and a depth sensor that are transportable with the device. The method includes receiving image data from the monocular camera, and determining a benefit level of activating the depth sensor for localization, based on the image data. The method activates the depth sensor for localization based on a determination that the benefit level of activating the depth sensor satisfies an activation rule.

Some other related embodiments are directed to a computer program product for performing localization using one or both of a monocular camera and a depth sensor that are transportable with a device. The computer program product includes a non-transitory computer readable medium storing instructions executable at least one processor of the device to configure the device to receive image data from the monocular camera, determine a benefit level of activating the depth sensor for localization, based on the image data, and activate the depth sensor for localization based on a determination that the benefit level of activating the depth sensor satisfies an activation rule.

Potential advantages of one or more of these embodiments may include that the device is able to determine using image data from a monocular camera when a depth sensor can provide a sufficient benefit level such that it should be activated from a deactivated state for subsequent use in localization. In this manner, the depth sensor does not have to already be activate in order to programmatically determine whether it would provide a sufficient benefit level for use in localization to justify its activation and use. These operations can reduce the energy consumption and computational resource utilization of the device when performing localization.

BRIEF DESCRIPTION OF THE DRAWINGS

Aspects of the present disclosure are illustrated by way of example and are not limited by the accompanying drawings. In the drawings:

FIGS. 6 through 12 illustrate flowcharts of operations by a device for controlling activation of a monocular camera and deactivation of a depth sensor for localization in accordance with some embodiments of the present disclosure.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Methods, devices, and computer program products are disclosed that determine when a depth sensor should be activated, given that only a monocular camera is currently active. In this way, the depth sensor does not have to be activated to understand if the depth sensor would be beneficial to use for localization when a monocular camera is already being used for localization. Some further embodiments are directed to determining when the monocular camera should be deactivated after the depth sensor has become activated. These embodiments can reduce the energy consumption and computational resource utilization of the device when performing localization.

As will be explained below, a benefit level of activating a depth sensor for localization is determined based on image data from a monocular camera, such as based on structural information for physical objects identified in the image data. The depth sensor is activated for localization based on a determination that the benefit level of activating the depth sensor satisfies an activation rule. Although various embodiments are described in the context of performing localization, these and other embodiments can be used to perform combined localization and mapping operations, such as SLAM. Accordingly, the term "localization" is used herein to interchangeably refer to operations that are only configured to perform localization functionality and to operations that are configured to perform a combination of localization and mapping functionality, such as SLAM.

Figure 1:
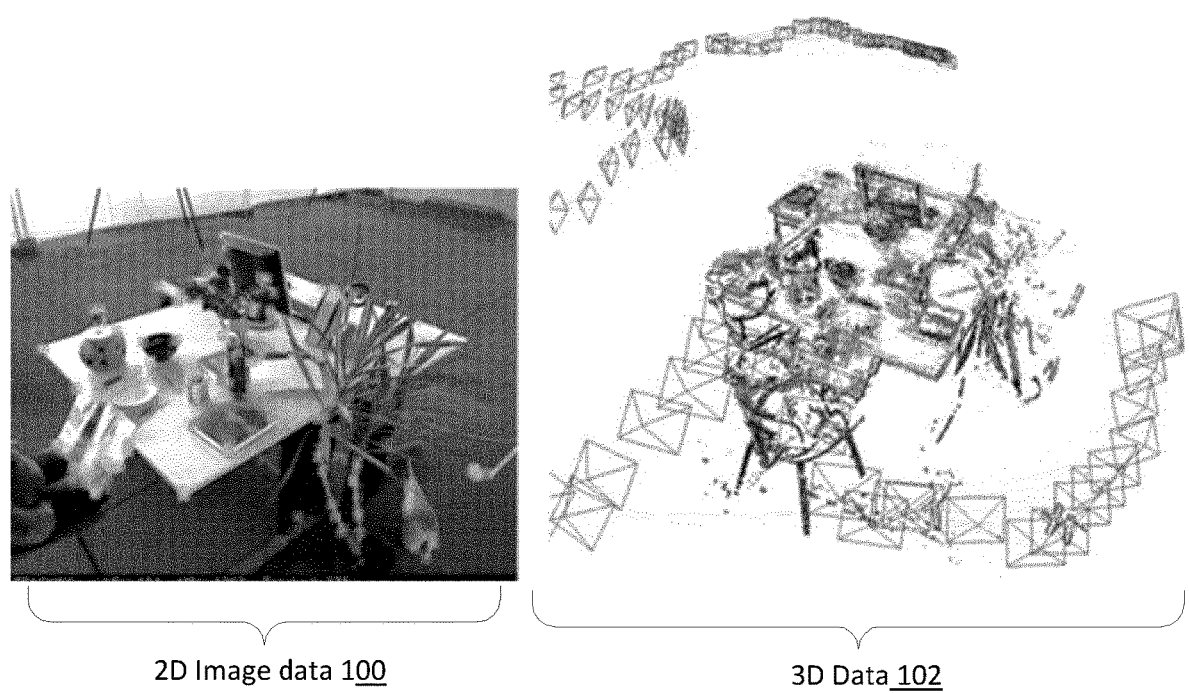
FIG. 1 illustrates operations that convert a two-dimensional (2D) image obtained from a monocular camera into three-dimensional (3D) data which is then processed to determine the benefit level that can be obtained by activating a depth sensor for use in localization, in accordance with some embodiments.

Various embodiments of the present disclosure are described in the context of a device that includes both a monocular camera (e.g. RGB camera) and a depth sensor. The device may further include an Inertial Measurement Unit (IMU). FIG. 1 illustrates operations that convert a 2D image data 100 from a monocular camera into 3D data 102 which is then processed to determine the benefit level that can be obtained by activating a depth sensor for use in localization. A typical Visual-Inertial SLAM algorithm applied on a sensor capturing RGB and IMU information can reconstruct depth of a scene but this 3D data 102 is typically sparse (e.g. a sparse point cloud), where a dense depth reconstruction can be performed at a higher computational cost. The 2D image 100 is illustrated as a point cloud form of image data received from a monocular camera used for SLAM. The dots on the 2D image data 100 are visual features extracted from the 2D image data 100. The 3D data 102 is illustrated as a sparse reconstruction of the environment.

Although various embodiments are described herein in the context of using 3D depth data from a depth sensor and using 2D image data from a monocular camera, it is to be understood that any dimensional (e.g., 1D, 2D, 3D) data can be used. For example, the term "3D depth data" refers to depth data from a depth sensor which provides a three-dimensional indication of sensed depth to environmental objects. In contrast, the term "depth data" refers to depth data from a depth sensor which provides any dimensional indication of sensed depth to environmental objects.

Machine learning based methods may be used to extract depth information from single RGB 2D image data 100 as well, or combining RGB 2D images 100 with 3D data 102 from 3D information collected by depth sensors or SLAM algorithms. On the other hand, using a depth sensor typically provides better estimates and denser depth information, but consumes more energy and utilizes more computing resources since depth sensors contain higher power circuitry and out higher bandwidth data. Depth sensors also have a limited depth measuring range.

Potential advantages of one or more of the embodiments disclosed herein may include that the device is able to determine using image data from a monocular camera when a depth sensor can provide a sufficient benefit level such that it should be activated from a deactivated state for subsequent use in localization. In this manner, the depth sensor does not have to already be activate in order to programmatically determine whether it would provide a sufficient benefit level for use in localization to justify its activation and use. These operations can reduce the energy consumption and computational resource utilization of the device when performing localization.

In some embodiments, the following operations can be performed to determine whether the benefit level of activating the depth sensor is sufficient to trigger its activation, and which may further determine whether the monocular camera should be deactivated:
1. Receive image data from a monocular data;
2. Determine a benefit level of activating the depth sensor, based on the image data from the monocular data;
3. Activate the depth sensor for localization if it is beneficial to activate the depth sensor based on the determined benefit level; and
4. (Optionally) Determine a benefit level of continuing to use the monocular camera for localization, based on image data from the monocular camera and based on depth data from the depth sensor after the activation of the depth sensor has been performed, and deactivate the monocular camera based on determining that the benefit level of continuing to use the monocular camera for localization satisfies a deactivation rule.

Figure 5:
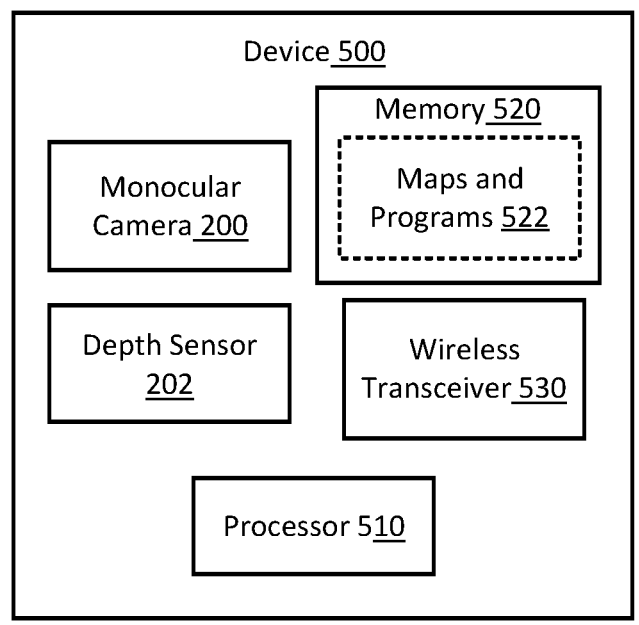
FIG. 5 illustrates a block diagram of components of a device that are configured in accordance with some embodiments of the present disclosure.
Figure 6:
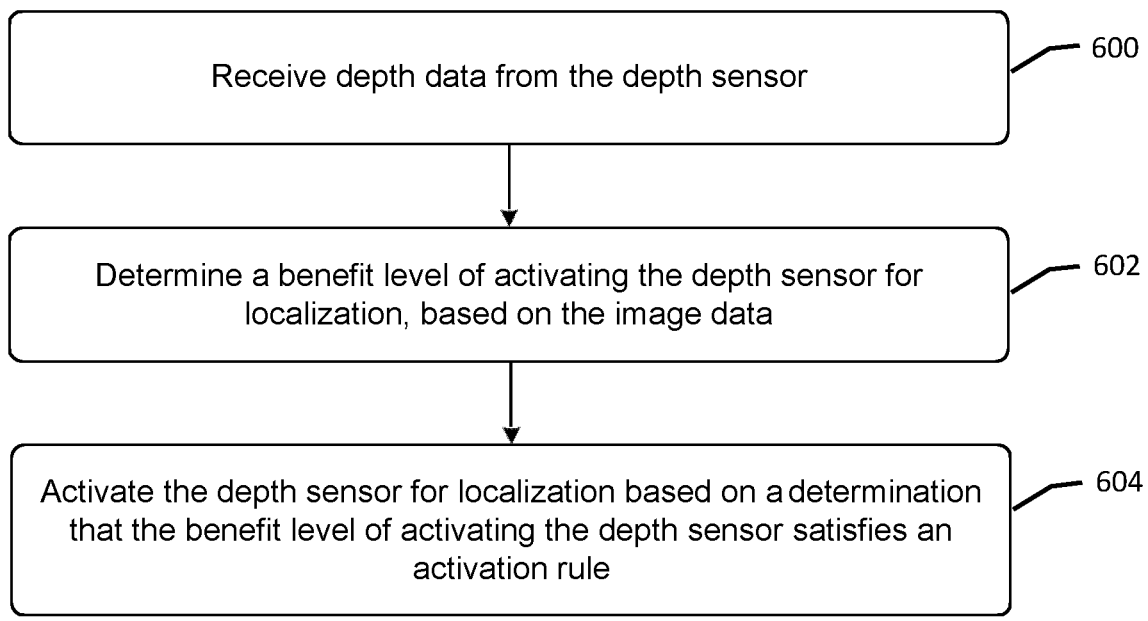

FIG. 5 illustrates a block diagram of components of an example device 500 that are configured in accordance with some embodiments of the present disclosure. FIG. 6 illustrate a flowchart of operations that may be performed by the device 500 to control activation of a depth sensor 202 for localization based on a determination that the benefit level of activating the depth sensor 202 for localization satisfies an activation rule, in accordance with some embodiments of the present disclosure.

Referring to FIGS. 5 and 6, in some embodiments, the device 500 includes at least one processor 510 (hereinafter "processor") operationally connected to a monocular camera 200, a depth sensor 202, and at least one memory 520 (hereinafter "memory") storing program code that is executed by the processor 510 to perform operations to receive 600 image data from the monocular camera 200. The operations determine 602 a benefit level of activating the depth sensor 202 for localization, based on the image data, and activate 604 the depth sensor 202 for localization based on a determination that the benefit level of activating the depth sensor 202 satisfies an activation rule. The memory 520 may include maps and programs 522 (e.g., localization map repository) which may be used as explained below. The device 500 may include a wireless transceiver 530 that is configured to communicate through a wireless interface.

The depth sensor 202 and the monocular camera 200 are transportable with the device 500 but are not necessarily part of the device 500. For example, although FIG. 5 illustrates that the device 500 includes the depth sensor 202, the monocular camera 200, the processor 510, and the memory 520, in some embodiments one or more of these components may be separate from the device 500 and communicatively connected thereto through the wireless transceiver 530 and/or a wired interface. The device 500 can be, but is not limited to, a component of any of a smartphone, wearable computer, augmented reality headset, virtual reality headset, mixed reality headset, semi-autonomous or autonomous vehicle, drone, aircraft, robot, etc.

Although various embodiments are described in the context of activating and deactivating individual sensors, e.g., one monocular camera and one depth sensor, these embodiments may be used to activate and deactivate sets of sensors. Thus, for example, the "monocular camera" may correspond to a set of monocular cameras, the "depth sensor" may correspond to a set of depth sensors. A set of sensors may contain homogeneous or non-homogenous types of sensors.

Figure 3:
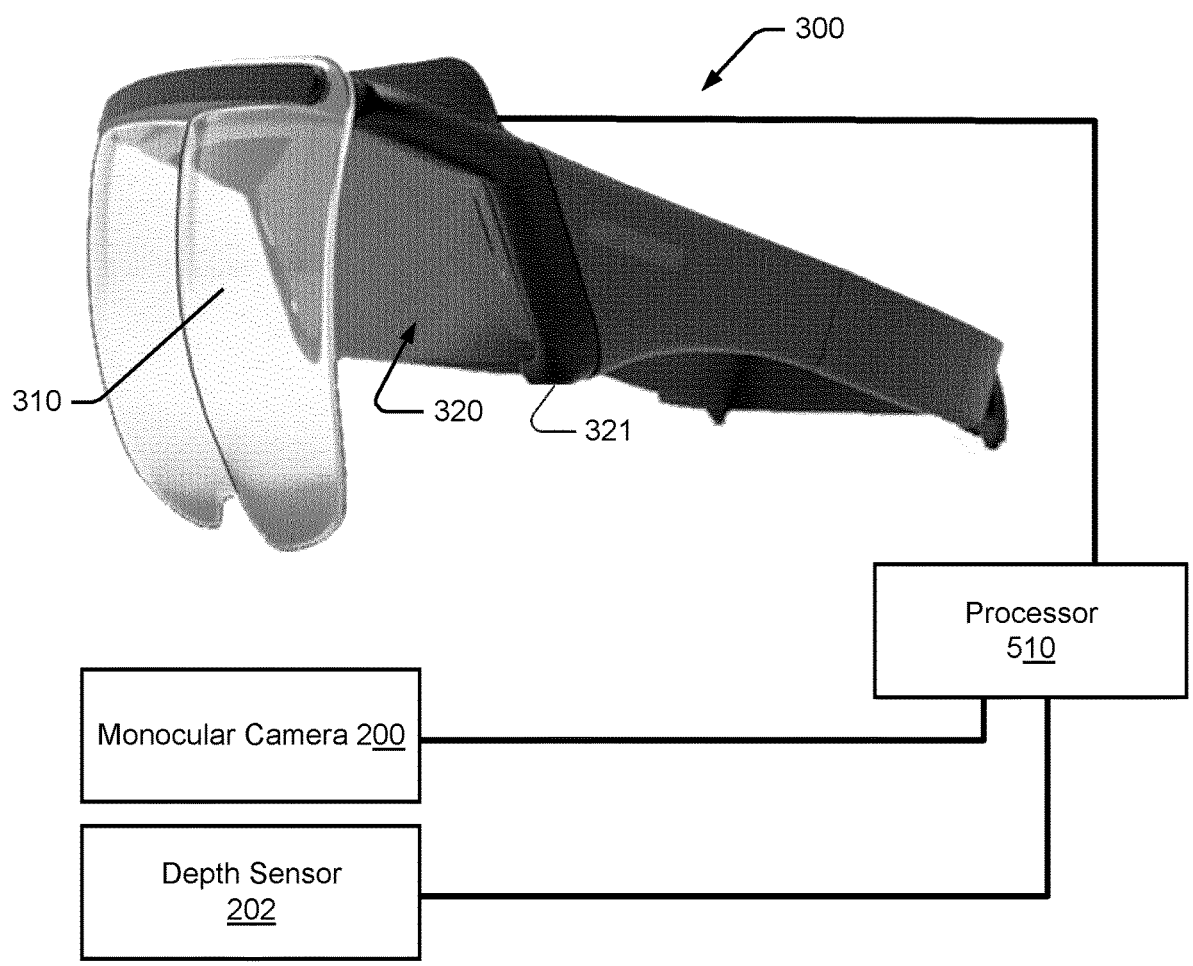
FIG. 3 illustrates a mixed reality (MR) system that includes a MR headset that holds a mobile electronic device which can include or is operationally connected to a set of sensors and configured to operate in accordance with some embodiments of the present disclosure.

FIG. 3 illustrates a mixed-reality (MR) system that includes a MR headset 300 that holds a mobile electronic device 320 which can be operationally connected, e.g., via wired and/or wireless communication interfaces, to at least one monocular camera 200 and at least one depth sensor 202. The mobile electronic device 320 can include or be operationally connected to a processor 510 and memory storing program code that configures the processor 510 to activate and deactivate individual one(s) of the monocular camera 200 and depth sensor 202 while using the active one(s) of the monocular camera 200 and depth sensor 202 to perform localization.

As shown in FIG. 3, the MR headset 300 includes a lens 310 through which a user who is wearing the MR headset can view real-world features. The MR headset 300 further includes a holder 321 that is configured to releasably retain the mobile electronic device 320 in a defined orientation relative to the lens 310 so that images displayed on a display device of the mobile electronic device 320 are reflected by the lens 310 directly or indirectly toward the user's eyes. Although not shown, the MR headset 300 may include intervening mirrors that are positioned between the lens 310 and the user's eyes and, hence, the light may be reflected directly or indirectly toward the user's eyes and/or the monocular camera 200.

The mobile electronic device 320 can include, but is not limited to, a smart phone, a palmtop computer, a tablet computer, gaming device, or other computing device. A "mobile electronic device" is also referred to herein as a "mobile device" and "device" for brevity.

Figure 2:
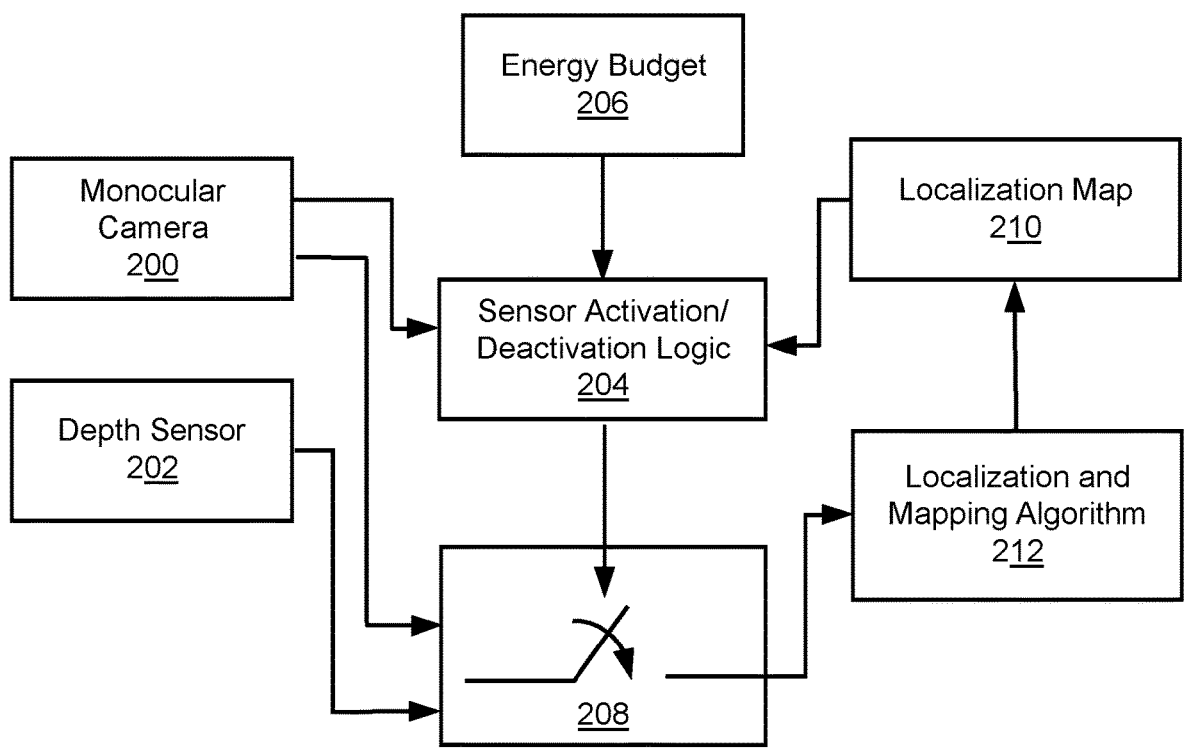
FIG. 2 illustrates a system diagram of a device for localization in accordance with some embodiments of the present disclosure.

FIG. 2 illustrates a system diagram of the device 500 configured to perform localization operations and/or combined localization and mapping operations, e.g., SLAM, using the depth sensor 202 and the monocular camera 200 in accordance with some embodiments of the present disclosure. Referring to FIG. 2, the device 500 includes sensor activation and deactivation logic 204 which is configured to determine a benefit level of activating the depth sensor 202 for localization operations based on the image data from the monocular camera 200, and to selectively activate the depth sensor 202 based on the determination. The sensor activation and deactivation logic 204 may also be configured to deactivate the monocular camera 200 based on a determination that the benefit level of continuing to use the monocular camera 200 for localization satisfies a deactivation rule, such as when the depth sensor 202 has become activated for localization and when continued use of the monocular camera 200 does not provide sufficient continued benefit. While the monocular camera 200 is active, image data is provided from the monocular camera 200 to a localization algorithm, such as a localization and mapping algorithm 212. Similarly, while the depth sensor 202 is active, depth data is provided from the depth sensor 202 to the localization algorithm, such as the localization and mapping algorithm 212.

The sensor activation and deactivation logic 204 controls switch logic 208 that performs deactivation and activation of selected ones of the sensors 200 and 202. The switch logic 208 can perform activation of a sensor (i.e., the depth sensor 202 or the monocular camera 200) by triggering at least one of transitioning the sensor to a higher power state, powering-on the sensor, powering-on an active component of the sensor which senses the environment (e.g., LIDAR laser component, infrared emitter, etc.), increasing a data sampling rate of the sensor or a component thereof to a level which is used for localization, increasing resolution of the sensor to a level which is used for localization, changing an optical parameter (e.g., focal length, field of view, etc.) to what is used for localization, and adapting the localization algorithm to use parameters (e.g., optical parameters) of the sensor. Conversely, the switch logic 208 can perform deactivation of the sensor by triggering at least one of transitioning the sensor to a lower power state, powering-off the sensor, powering-off an active component of the sensor which senses the environment (e.g., LIDAR laser component, infrared emitter, etc.), decreasing a data sampling rate of the sensor or an active component thereof to a level below what is used for localization, decreasing resolution of the sensor to a level which is below what is used for localization, changing an optical parameter (e.g., focal length, field of view, etc.) to what is not used for localization, and adapting the localization algorithm to cease using parameters (e.g., optical parameters) of the sensor. Accordingly, the term "switch" is not constrained to an off-on switch but alternatively or additionally can include control logic that performs one or more of the more complex above-activities for activating and deactivating sensors.

In one embodiment, the operations to adapt the localization algorithm to use optical parameters of a sensor for localization can include obtaining algorithm parameters corresponding to the optical parameters of the sensor. The algorithm parameters can be predetermined based on offline tuning of the localization algorithm for different sets of optical parameters. Then, based on a defined set of optical parameters for a sensor, the corresponding predetermined algorithm parameters are selected for use.

As will be explained in further detail below, the sensor activation and deactivation logic 204 may operationally use information provided by an energy budget 206 and/or information provided by a localization map 210, which may reside in the map 522 in FIG. 5, to determine when to activate the depth sensor 202 and/or when to deactivate the monocular camera 200.

In order for the depth sensor 202 to provide depth data that can be used for localization operations and/or combined localization and mapping operations, e.g., SLAM, the depth sensor 202 has to be able to sense relevant environmental features. Various alternative embodiments of operations will now be explained that can determine the benefit level of activating the depth sensor based on the performance of a localization algorithm, such as the localization and mapping algorithm 212.

Methods for quantifying localization and mapping performance of using the depth sensor 202 are discussed below.

The performance of the localization and mapping using depth data from the depth sensor 202 will rely on the capabilities of the depth sensor 202 to sense structural information from the environment in a robust way. The information sensed by the depth sensor 202, such as in consecutive depth data frames, is used to determine the motion properties of the device, while this information may also be stored as a map and later used for localization, where a matching between the map and online depth information is performed.

The more physical structure the scene has, the more information from the depth sensor 202 will be possible to be sensed and used in the localization and mapping algorithm. Some localization and mapping algorithms rely on identifying distinct 3D features or structure shapes such as planes, but the 3D shapes of the structure which are used for localization and mapping may vary and be trained using machine learning methods. How well a depth-based localization and mapping algorithm relying on the depth sensor 202 and its robustness, can be directly related to the presence or absence, or the number of 3D features detected.

Depth sensors in general have certain limitations which will decrease the associated localization and mapping performance. Some of the limitations of depth sensors are:

a. Difficulty sensing structural elements in the presence of reflective surfaces such as mirrors;
 b. Depending on the resolution of the depth sensor, structural elements that are smaller than this solution may not be detected; and
 c. Limited measurement range, both with respect to minimum and maximum distance.

Various approaches are discussed below for determining if the depth sensor 202 would be able to capture sufficient relevant object features in the environment to justify activation of the depth sensor 202 localization, based on analyzing the 2D image data captured by the monocular camera 200. Various further related approaches are discussed below for determining the benefit level of using the depth sensor 202 for localization.

In some embodiments, the benefit level of activating the depth sensor 202 for localization is determined 602 (FIG. 6) based on sampling and analyzing the image data from the monocular camera 200 after conversion to 3D data, such as illustrated in FIG. 1. Corresponding operations are illustrated in FIG. 9, which are configured in accordance with some embodiments of the present disclosure. Referring to FIG. 9, the benefit level of activating the depth sensor 202 for localization is determined 602 (FIG. 6) based on processing 900 the image data from the monocular camera 200 through a localization algorithm to obtain depth points within an environment which is sensed by the monocular camera 200. The determination 602 of the benefit level is also based on estimating 902 a density of the depth points that are within a range of the depth sensor 202. The benefit level is determined 602 based on the estimate of the density of the depth points.

In a further embodiment, the estimation 902 of the density of the depth points that are within the range of the depth sensor includes identifying an object within the image data from the monocular camera having a determined physical size within the environment, and determining range of the depth points based on comparison of a size of the object within the image data to the physical size of the object.

From the localization and mapping algorithm running in the device 500 using only the images from the monocular camera 200, the operations can be configured to extract sparse depth points of the environment (see FIG. 1 for an example). However, the scale of the depth of the image data from the monocular camera 200 can only be extracted if the knowledge of the size of an object in the scene is available (which is a typical approach used in visual localization and mapping systems), or the range of the depth points can be estimated or directly inferred if the device 500 has an inertial measurement unit (IMU) being used for performing the localization and mapping (which may be advantageous and that most mobile devices have an IMU). For example, the IMU can measure distance traveled between consecutive images, which can then be used to determine the scale of the depth points estimated through those images. Hence, given the depth sensor range, operations can determine how much information will be possible to be collected using the depth sensor 202 if the depth sensor 202 were to be activated for localization, i.e. what is the benefit level of activating the depth sensor 202 for localization.

In one illustrative embodiment, if the amount of depth points (voxels) contained in the data (e.g., point cloud) within the minimum and maximum range and within the field of view of the depth sensor 202, i.e., "density of points", is above a threshold X, then there is a benefit of activating the depth sensor 202. The threshold X can be defined using offline methods and adapted in runtime. For example, a training session is performed where monocular camera 200 and the depth sensor 202 are active so a point cloud (including depth data and image data) can be both collected and may be combined with IMU sensor information, and the performance of the localization and mapping algorithm is determined as a function of the density of the point cloud captured by the depth sensor 202 (for example, the minimum density d_min_depth is required for a reasonable performance), which will correspond to a certain depth density d_monocular for the monocular camera 200, e.g. finding the minimum value for d_monocular which guarantees that the depth density for the depth sensor 202 d_depth>d_min_depth given a training set. The threshold can also be adapted in runtime using the same training sequence.

In a further illustrative embodiment, the values for d_min_depth may be 20000, while during the training it may be found that d_monocular>500 to achieve d_depth>20000. Commercially available depth sensors can, for example, provide depth resolutions from 320×240 to 640×480 which produce a point cloud count of between 76,800 and 307,200 points/voxels.

In some embodiments, the benefit level of activating the depth sensor 202 for localization can be determined 602 (FIG. 6) based on sampling and analyzing the image data from the monocular camera 200 after conversion to 3D data. Referring to the flow chart of operations illustrated in FIG. 10 for one embodiment, the determination 602 (FIG. 6) of the benefit level of activating the depth sensor 202 for localization can include processing 1000 the image data from the monocular camera 200 through a localization algorithm to obtain depth points within an environment which is sensed by the monocular camera 200. The determination 602 (FIG. 6) of the benefit level of activating the depth sensor 202 for localization can also include determining 1002 a number of 3D features within depth reconstruction data for a portion of the environment based on a sequence of frames of the image data and the depth points. The benefit level is determined 602 (FIG. 6) based on the number of the 3D features.

In a further embodiment, the benefit level of activating the depth sensor is determined to satisfy the activation rule based on the number of the 3D features satisfying a minimum threshold. The minimum threshold may be determined based on determining a minimum number of the 3D features which are needed for the localization algorithm to perform localization with at least a threshold level of accuracy.

The previous option can be combined with a 3D depth reconstruction algorithm which reconstructs parts of the depth of the environment based on the image data from the monocular camera 200 by extracting sparse points using the localization and mapping algorithm and the pose of the device, which can also be computed by the localization and mapping algorithm. For example, using these operations, a multi-view stereo approach or a pure machine learning-based monocular-to-depth reconstruction approach is provided. In this way, operations can directly infer if the structural properties of the environment provide enough information to the localization and mapping algorithm to obtain the desired performance and robustness using the depth sensor 202 and/or the monocular camera 200. This inference can be performed by applying the depth-based localization and mapping algorithm to the 3D reconstructed data and obtaining an indicator of a successful localization and mapping based on such data (e.g. sufficient 3D features such as planes are detected for a sequence of steps, etc., which is an indicator of a good performance of the localization and mapping algorithm). For example, the benefit level can be defined as the number of 3D features detected based on analyzing the point cloud created using the 3D reconstruction algorithm, for which a threshold minimum number of 3D features X ("threshold X") should be detected in order for the localization and mapping algorithm to have a desired performance when using the depth sensor 202. The 3D features may be detected as described in "SegMap: 3D Segment Mapping Using Data-Driven Descriptors", R. Dubé, A Cramariuc, D. Dugas, J. Nieto, R. Siegwart, and C. Cadena, arXiv:1804.09557, DOI: 10.15607/RSS.2018.XIV.003, 2018. The threshold minimum number of 3D features X can be determined based on offline experiments to determine the positioning performance (e.g. accuracy) given different values of threshold X.

In another example, the above-approach can be directly applied to the point cloud created using the 3D reconstruction algorithm and identify how many voxels are within the range of the depth sensor 202, where the number of voxels defines the benefit level, where it would be beneficial to activate the depth sensor 202 if the number of voxels is above threshold X.

Figures 11, 12:
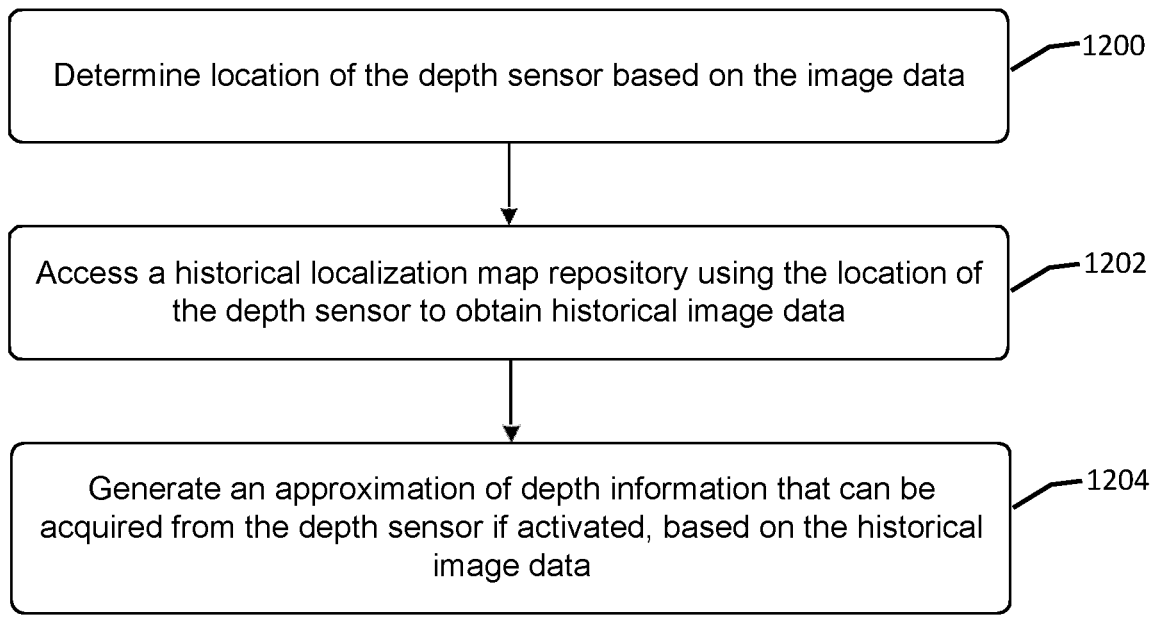

In some embodiments, the benefit level of activating the depth sensor 202 for localization is determined 602 based on sampling and analyzing the image data from the monocular camera 200 after conversion to 3D data. Corresponding operations are illustrated in FIG. 11, which are configured in accordance with some embodiments of the present disclosure. Referring to FIG. 11, the benefit level of activating the depth sensor 202 for localization is determined 602 (FIG. 6) based on processing 1100 the image data from the monocular camera 200 through an object recognition algorithm and a localization algorithm to obtain a physical object viewed by the monocular camera 200 including dimensions of the physical object and the physical object's position relative to the device. The benefit level is determined 602 (FIG. 6) based on at least one of a type and size of the structure and based on distance between the structure and the device.

The device 500 can apply conventional object recognition algorithms and infer the physical structure of a scene (e.g. tables, chairs, walls, desks, closets, etc.) and the dimensions of such structures and their position relative to the device. Then, the benefit level of this information can be proportional to the type and/or size of the detected objects and/or their distance with respect to the device 500. For example, in an offline manner operations can evaluate the performance of the depth-based localization and mapping algorithm (e.g. the pose uncertainty, the positioning error with respect to a known ground truth measurement, etc.) given the presence of objects of type A (e.g. a desk) in the environment which are within the range of the depth sensor 202, and so a table can be created where the correspondence between the number of objects of given types and their benefit level is indicated. Hence, if objects of a defined type are found within the range and field of view of the depth sensor 202 then the depth-based localization and mapping 10 perform well using the depth sensor 202. This option can then be seen as a combination of object detection, where instead of checking the number of voxels within the depth sensor range, operations check if specific objects are within the depth sensor range.

As another example, the benefit level may be defined as the size of detected objects (e.g. 3D bounding box around the object as proposed in this paper) or as the number of detected objects of a specific type (e.g. all furniture objects), and where if the size of the objects and/or the number of detected objects is above a minimum volume Y than it is determined that it is beneficial to activate the depth sensor 202. Again, the threshold X may be defined by performing offline experiments, where the localization and mapping performance is evaluated (e.g. accuracy) with respect to the size and/or type of the object.

In some embodiments, the benefit level of activating the depth sensor 202 for localization is determined 602 based on sampling and analyzing the image data from the monocular camera 200 after conversion to 3D data. Corresponding operations are illustrated in FIG. 12, which are configured in accordance with some embodiments of the present disclosure. Referring to FIG. 12, the benefit level of activating the depth sensor 202 for localization is determined 602 (FIG. 6) based on determining 1200 location of the depth sensor 202 based on the image data from the monocular camera 200. The benefit level is also based on accessing 1202 a historical localization map repository (e.g., map 210 in FIG. 2) using the location of the depth sensor to obtain historical image data, and generating 1204 an approximation of depth information that can be acquired from the depth sensor if activated, based on the historical image data. The benefit level is determined 602 based on the approximation of depth information.

Figure 4:
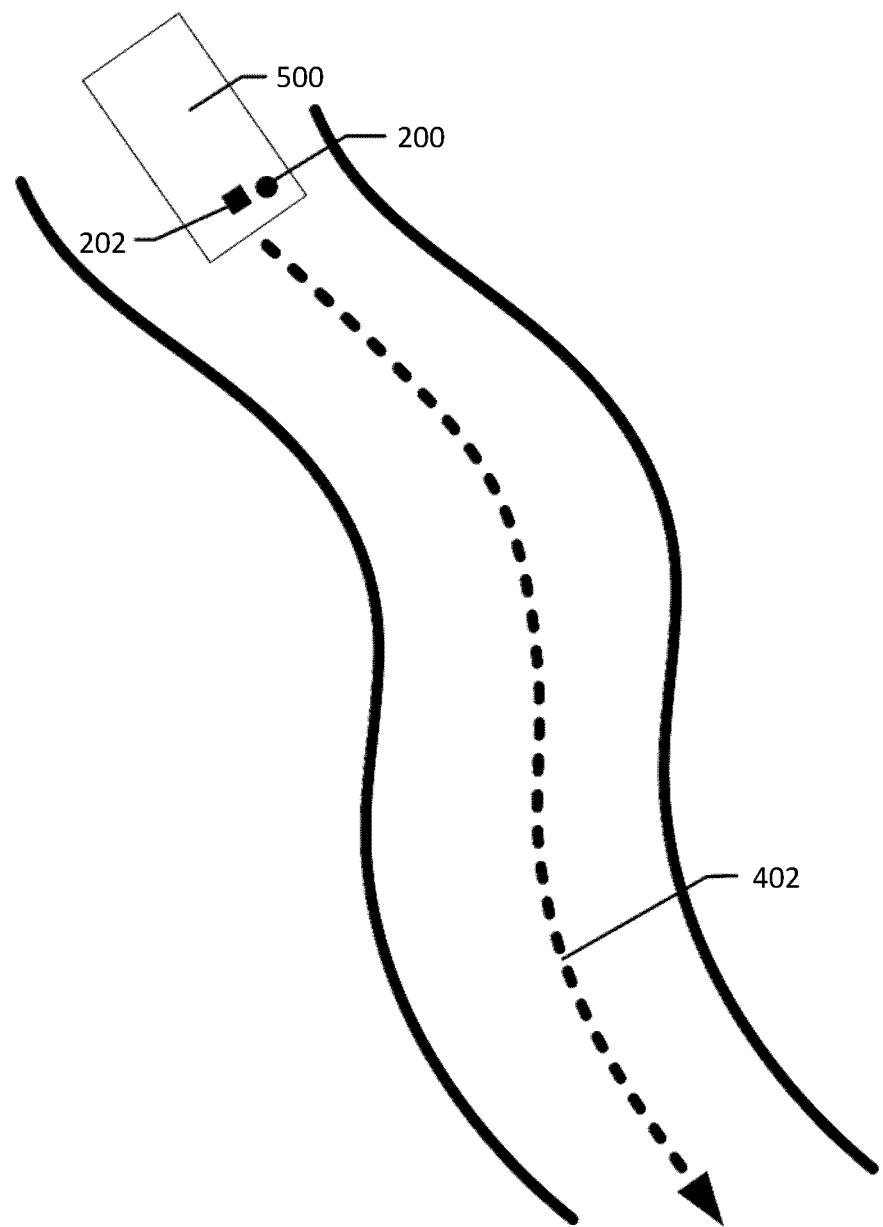
FIG. 4 illustrates a top-view of a device with a monocular camera and a depth sensor that is moving through an environment along a predicted motion trajectory.

FIG. 4 illustrates a top-view of a device 500 with a monocular camera 200 and a depth sensor 200 that is moving through an environment along a predicted motion trajectory 402. The predicted motion trajectory 402 can be used to obtain historical image data from a historical localization map repository (e.g., map 210 in FIG. 2), and generate 1204 an approximation of depth information that can be acquired from the depth sensor 202 if activated, based on the historical image data.

Accordingly, the operations can use historical image data through localization relative to a historical localization map built for the current environment using the monocular camera 200 and/or the depth sensor 202, to determine the amount of information that will be captured if the depth sensor 202 is activated at the current location for localization or at another location along the predicted motion trajectory 402 of the device 500. The historical localization map may be a sparse point cloud or may be a denser point cloud, which is built based on image data from the monocular camera 202 and/or depth data from the depth sensor 202. The historical localization map can be used in an online manner by the device 500 in order to perform localization.

Various operations for activating the depth sensor 202 based on the determined benefit level of activation for localization are explained below. In some embodiments, the operations for activating 604 the depth sensor 202 for localization when the benefit level satisfies an activation rule, includes determining that a value of the benefit level satisfies a threshold value.

Example operational determinations that the benefit level satisfies an activation rule for activating the depth sensor 202, can include any one or more of:
 a. The benefit level is above a defined threshold;
 b. A function of the benefit level that is obtained over a set of measurements (e.g. the average of the last N measurements with the monocular camera) is above a defined threshold; and
 c. A function of the benefit level obtained over a set of measurements performed on data from the localization map, given both the current measurement for the current pose of the device 500 as well as the predicted motion trajectory 402 of the device 500, is above a defined threshold.

After the depth sensor 202 is activated, the device 500 can determine if the monocular camera 200 should remain active or be deactivated.

The above operational embodiments can also be combined with the energy budget of the device. For example, if the above conditions are satisfied, a further determination can be made to confirm there is sufficient energy budget remaining for the monocular camera 200 to remain active after the depth sensor 202 becomes active. As explained above, a depth sensor generally consumes more energy than a monocular camera. If there is sufficient energy budget remaining after activation of the depth sensor 202 the monocular camera 200 may remain and, otherwise, the monocular camera 200 is deactivated after the depth sensor 202 is activated when there is insufficient energy budget remaining.

Performance of the localization algorithm may be improved by using data from both the monocular camera 200 and the depth sensor 202. Visual information of the scene captured by the monocular camera 200 can be processed by the localization algorithm in combination with depth data from the depth sensor 202. For example, in the case that frames of image data are used to determine certain objects in the scene which can assist with characterizing spatial ordering and/or visual characteristics of objects in an environment (e.g. you are in front of store X, or this is person Y in front of you, or today is sunny). In this case, the monocular camera 200 can be being used for SLAM processing and to provide a semantic understanding of the environment.

Another example reason that the monocular camera 200 can continue to be used for localization after activation of the depth sensor 202 is that frames of image data can be a preferable way to operationally recognize a certain location and optimize the map given that location, which are components of a SLAM framework. In this way, the monocular camera 200 can be used for performing the full SLAM and compute the pose estimate for the device. When the depth sensor 202 is also activate the monocular camera 200 can still be used for place recognition and loop closure while the depth sensor 202 performs the complete SLAM besides place recognition and loop closure. The depth sensor 202 can perform to build a map of the environment and compute the motion of the device with respect to it. This is an approach considered in RTAB-MAP which is another popular framework, as described in "RTAB-Map as an open-source lidar and visual simultaneous localization and mapping library for large-scale and long-term online operation", M. Labbé and F. Michaud, Journal of Field Robotics, Vol. 36, Issue 2, pages 416-446, https://doi.org/10.1002/rob.21831, Wiley, 2018.

Figure 7:
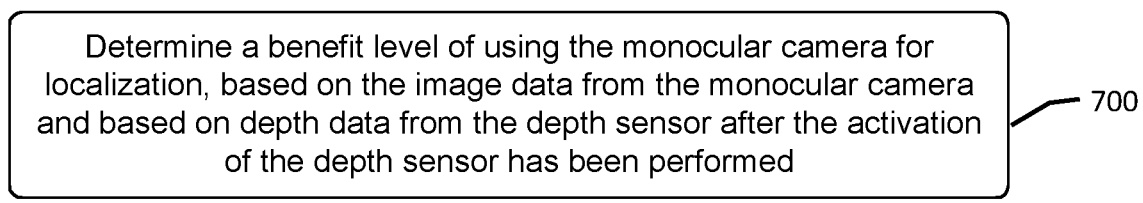

Referring to the embodiment of FIG. 7, the operations performed by the device 500 further include determining 700 a benefit level of using the monocular camera 200 for localization, based on the image data from the monocular camera 200 and based on depth data from the depth sensor 202 after the activation 604 of the depth sensor 202 has been performed. According to the further embodiment of FIG. 8, the operations then deactivate 800 the monocular camera 200 when the determined 700 benefit level of using the monocular camera for localization satisfies a deactivation rule.

In some embodiments, the operations for determining 700 that the benefit level of using the monocular camera 200 for localization satisfies the deactivation rule include determining a number of feature descriptors in the image data from the monocular camera 200, and determining that the number of feature descriptors in the image data within a common field of view of both the depth sensor 202 and the monocular camera 200 satisfies a threshold number of feature descriptors needed to perform localization.

In a further embodiment, the number of feature descriptors in the image data from the monocular camera 200 is limited to include only the feature descriptors that satisfy a feature quality threshold.

Various operations are now described which can determine the benefit level of using the monocular camera 200 based on analyzing the performance of the localization and mapping algorithm processing image data from the monocular camera 200, and which can be performed based on determining the number of features and/or the number and quality of the features detected in the image data. When the benefit level satisfies the deactivation rule, the monocular camera 200 can be deactivated, e.g., turned off. Otherwise, the monocular camera 200 can remain active and used to obtain superior performance/robustness of the localization algorithm.

In order for the monocular camera 200 to provide image data that can be used for localization operations and/or combined localization and mapping operations, e.g., SLAM, the monocular camera 200 has to be able to capture relevant environmental features. Various alternative embodiments of operations will now be described that can determine the benefit level of activating the depth sensor 202 based on the performance of a localization algorithm, such as the localization and mapping algorithm 212 using image data from the monocular camera 200.

The performance of the localization algorithm using image data from the monocular camera 200 is initially explained. The performance can be directly dependent on the detection of visual features by the monocular camera 200. If visual features needed for localization cannot be detected in a robust manner, the localization algorithm, e.g., the localization and mapping algorithm 212, will operationally fail. Feature descriptors (e.g. Scale-Invariant Feature Transform (SIFT), Binary Robust Invariant Scalable Keypoints (BRISK), Oriented FAST and Rotated BRIEF (ORB), machine learning-based) typically describe high-contrast regions of the image, such as edges, corners, etc. Not all measured features in localization and mapping algorithms, e.g., SLAM, contribute to accurate localization during the estimation process, thus operations herein may utilize only those that do. The ultimate goal is that the features can be detected in a robust manner which are able to provide geometric information regarding the motion of the monocular camera 200 based on a sequence of image data frames of a scene. Hence, the performance of the localization algorithm, e.g., localization and mapping algorithm 212, using the monocular camera 200 can be determined based on an assessment of the quantity and quality of detected features. Various embodiments disclosed herein are directed to determining a benefit level of activating the depth sensor 202 for localization, based on predicting the performance of the localization algorithm based on analysis of the image data from the monocular camera 200. The depth sensor 202 is then selectively activated for localization and/or combined localization and mapping, e.g., SLAM, based on whether the determined benefit level satisfies an activation rule.

The above embodiment can be combined with using the energy budget 206 of the device 500 to determine whether the benefit level of activating the depth sensor 202 satisfies the activation rule and/or whether the continued use of the monocular camera 200 localization after activation the depth sensor 202 satisfies a deactivation rule. Use of the energy budget 206 enables the device 500 to avoid a situation where activation of the depth sensor 202 while the monocular camera 200 is active would result in power consumption that exceeds the energy budget 206. The device 500 may activate the depth sensor 202 but then deactivate monocular camera 200 in order to avoid prolonged power consumption exceeding the energy budget 206. In the corresponding embodiment, the determination 700 that the benefit level of using the monocular camera 200 for localization satisfies the deactivation rule comprises determining that use of both the depth sensor 202 and the monocular camera 200 for localization consumes energy at a level greater than the energy budget 206 of the device 500.

In a further embodiment, the determination 700 that the benefit level of using the monocular camera 200 for localization satisfies the deactivation rule includes determining that use of both the depth sensor 202 and the monocular camera 200 for localization consumes energy at a level greater than an energy budget 206 of the device 500.

Deactivation of a sensor (e.g., the monocular camera 200 or the depth sensor 202) in various embodiments herein may be performed by triggering at least one of transitioning the sensor to a lower power state, powering-off the sensor, powering-off an active component of the sensor which senses the environment (e.g., LIDAR laser component, infrared emitter, etc.), decreasing a data sampling rate of the sensor or an active component thereof to a level below what is used for localization, decreasing resolution of the sensor to a level which is below what is used for localization, changing an optical parameter (e.g., focal length, field of view, etc.) to what is not used for localization, and adapting the localization algorithm to cease using parameters (e.g., optical parameters) of the sensor.

As explained above, activation of a sensor (i.e., the depth sensor 202 or the monocular camera 200) may be performed by triggering at least one of transitioning the depth sensor to a higher power state, powering-on the sensor, powering-on an active component of the sensor which senses the environment (e.g., LIDAR laser component, infrared emitter, etc.), increasing a data sampling rate of the sensor or an active component thereof to a level which is used for localization, increasing resolution of the sensor to a level which is used for localization, changing an optical parameter (e.g., focal length, field of view, etc.) to what is used for localization, and adapting the localization algorithm to use parameters (e.g., optical parameters) of the sensor.

Thus in some embodiments, activation 604 of the depth sensor 202 includes triggering at least one of transitioning the depth sensor 202 to a higher power state, powering-on the depth sensor 202, increasing a data sampling rate of the depth sensor 202 to a level which is used for localization, increasing resolution of the depth sensor 202 to a level which is used for localization, and adapting a localization algorithm to use depth sensing parameters of the depth sensor 202.

Some other related embodiments are directed to a corresponding method by a device for performing localization using one or both of a monocular camera and a depth sensor that are transportable with the device. The method includes: receiving 600 image data from the monocular camera, determining 602 a benefit level of activating the depth sensor for localization, based on the image data, and activating 604 the depth sensor for localization based on a determination that the benefit level of activating the depth sensor satisfies an activation rule. In various further embodiments the method further performs any of the operations described above in the context of FIGS. 1-12.

Some other related embodiments are directed to computer program product for performing localization using one or both of a monocular camera 200 and a depth sensor 202 that are transportable with a device 500. The computer program product includes a non-transitory computer readable medium 520 storing instructions executable at least one processor 510 of the device to configure the device 500 to: receive image data from the monocular camera 200, determine a benefit level of activating the depth sensor 202 for localization, based on the image data, and activate the depth sensor 202 for localization based on a determination that the benefit level of activating the depth sensor 202 satisfies an activation rule. In various further embodiments the instructions further configure the at least one processor 510 of the device 500 to further perform any of the operations described above in the context of FIGS. 1-12.

Further definitions and embodiments are explained below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:
1. A device comprising:
at least one processor circuit operationally connected to a monocular camera and a depth sensor;
at least one memory circuit storing program code that is executed by the at least one processor circuit to perform operations to:
receive image data from the monocular camera;
determine a benefit level of activating the depth sensor for localization, based on processing the image data from the monocular camera through a localization algorithm to obtain depth points within an environment which is sensed by the monocular camera, and estimating a density of the depth points that are within a range of the depth sensor, wherein the benefit level is determined based on the estimate of the density of the depth points; and activate the depth sensor for localization based on a determination that the benefit level of activating the depth sensor satisfies an activation rule, wherein the benefit level of activating the depth sensor is determined to satisfy the activation rule based on the density of the depth points that are within the range of the depth sensor satisfying a minimum threshold.

2. The device of claim 1, wherein the operations determine a benefit level of using the monocular camera for localization, based on the image data from the monocular camera and based on depth data from the depth sensor after the activation of the depth sensor has been performed.

3. The device of claim 2, wherein the operations deactivate the monocular camera based on a determination that the benefit level of using the monocular camera for localization satisfies a deactivation rule, wherein the determination that the benefit level of using the monocular camera for localization satisfies the deactivation rule comprises:
    determining a number of feature descriptors in the image data from the monocular camera, and
    determining that the number of feature descriptors in the image data within a common field of view of both the depth sensor and the monocular camera satisfies a threshold number of feature descriptors needed to perform localization.

4. The device of claim 2, wherein the operations deactivate the monocular camera based on a determination that the benefit level of using the monocular camera for localization satisfies a deactivation rule, wherein the determination that the benefit level of using the monocular camera for localization satisfies the deactivation rule comprises determining that use of both the depth sensor and the monocular camera for localization consumes energy at a level greater than an energy budget of the device.

5. The device of claim 2, wherein the operations deactivate the monocular camera based on a determination that the benefit level of using the monocular camera for localization satisfies a deactivation rule, wherein the determination that the benefit level of using the monocular camera for localization satisfies the deactivation rule, is performed based on a hardware resource utilization that is obtained for device performing localization using the monocular camera, wherein the hardware resource utilization is determined based on a level of utilization of the at least one processor circuit to perform localization using the monocular camera and/or a level of utilization of the at least one memory circuit to perform localization using the monocular camera.

6. The device of claim 1, wherein the activation of the depth sensor comprises one of triggering at least one of transitioning the depth sensor to a higher power state, powering-on the depth sensor, increasing a data sampling rate of the depth sensor to a level which is used for localization, increasing resolution of the depth sensor to a level which is used for localization, and adapting a localization algorithm to use depth sensing parameters of the depth sensor.

7. The device of claim 1, wherein the estimating of the density of the depth points that are within the range of the depth sensor, comprises:
    identifying an object within the image data from the monocular camera having a determined physical size within the environment; and
    determining range of the depth points based on comparison of a size of the object within the image data to the physical size of the object.

8. The device of claim 1, wherein the benefit level of activating the depth sensor for localization is further determined based on:
    determining a number of three-dimensional, 3D, features within depth reconstruction data for a portion of the environment based on a sequence of frames of the image data and the depth points,
    wherein the benefit level is further determined based on the number of the 3D features.

9. The device of claim 8, wherein the benefit level of activating the depth sensor is determined to satisfy the activation rule based on the number of the 3D features satisfying another minimum threshold.

10. The device of claim 1, wherein the benefit level of activating the depth sensor for localization is determined, comprises:
    processing the image data from the monocular camera through an object recognition algorithm and a localization algorithm to obtain a physical object viewed by the monocular camera including dimensions of the physical object and the physical object's position relative to the device,
    wherein the benefit level is further determined based on at least one of a type and size of the structure and based on distance between the structure and the device.

11. The device of claim 1, wherein activating the depth sensor for localization based on the determination that the benefit level of activating the depth sensor satisfies the activation rule comprises determining that a value of the benefit level satisfies a threshold value.

12. A method performed by at least one processor circuit of a device, the method comprising:
    receiving image data from a monocular camera;
    determining a benefit level of activating a depth sensor for localization, based on processing the image data from the monocular camera through a localization algorithm to obtain depth points within an environment which is sensed by the monocular camera, and estimating a density of the depth points that are within a range of the depth sensor, wherein the benefit level is determined based on the estimate of the density of the depth points; and
    activating the depth sensor for localization based on a determination that the benefit level of activating the depth sensor satisfies an activation rule, wherein the benefit level of activating the depth sensor is determined to satisfy the activation rule based on the density of the depth points that are within the range of the depth sensor satisfying a minimum threshold.

13. The method of claim 12, further comprising:
    determining a benefit level of using the monocular camera for localization, based on the image data from the monocular camera and based on depth data from the depth sensor after the activation of the depth sensor has been performed; and
    deactivating the monocular camera based on a determination that the benefit level of using the monocular camera for localization satisfies a deactivation rule.

* * * * *